(12) United States Patent
Koenig (10) Patent No.: US 9,586,770 B2
(45) Date of Patent: Mar. 7, 2017

(54) MATERIAL WASTE SORTING SYSTEM AND METHOD

(76) Inventor: Mark E. Koenig, Pickerington, OH (US)

( * ) Notice: Subject to any disclaimer, the term of this patent is extended or adjusted under 35 U.S.C. 154(b) by 747 days.

(21) Appl. No.: 13/567,819

(22) Filed: Aug. 6, 2012

(65) Prior Publication Data

US 2013/0192478 A1 Aug. 1, 2013

Related U.S. Application Data

(60) Provisional application No. 61/515,842, filed on Aug. 5, 2011.

(51) Int. Cl.
| | | |
|---|---|---|
| *B30B 11/24* | (2006.01) | |
| *B30B 15/14* | (2006.01) | |
| *B30B 15/26* | (2006.01) | |
| *B65G 65/40* | (2006.01) | |
| *B65G 65/46* | (2006.01) | |
| *B65D 88/26* | (2006.01) | |
| *B30B 9/30* | (2006.01) | |
| *B65G 69/20* | (2006.01) | |

(52) U.S. Cl.
CPC .............. *B65G 65/40* (2013.01); *B30B 9/301* (2013.01); *B30B 9/3039* (2013.01); *B30B 11/24* (2013.01); *B30B 11/241* (2013.01); *B30B 15/14* (2013.01); *B30B 15/26* (2013.01); *B65D 88/26* (2013.01); *B65G 65/46* (2013.01); *B65G 69/20* (2013.01)

(58) Field of Classification Search
CPC ..... B30B 11/24; B30B 11/245; B30B 11/246; B30B 9/12; B30B 9/121; B30B 9/128; B30B 9/14; B30B 9/16; B30B 9/301; B30B 11/241; B30B 15/14; B30B 15/26; B65G 65/40; B65G 65/46; B65G 69/20
USPC .... 100/43, 117, 144, 145; 414/21, 325, 326, 414/808; 209/930
See application file for complete search history.

(56) References Cited

U.S. PATENT DOCUMENTS

| | | |
|---|---|---|
| 728,516 A | 5/1903 | Trabue |
| 829,315 A | 8/1906 | Anderson |
| 1,221,054 A | 4/1917 | Hyatt |
| 1,506,036 A | 8/1924 | Willmarth |

(Continued)

OTHER PUBLICATIONS

FKC Co., Ltd., Biosolids Dewatering, sales literature, 2 pages, found at www.fkcscrewpress.com, copyrighted 2009.

(Continued)

*Primary Examiner* — Jimmy T Nguyen
(74) *Attorney, Agent, or Firm* — Standley Law Group LLP (57) ABSTRACT

Exemplary embodiments include improved systems and methods for sorting and metering materials to be recycled at a material recovery facility. Systems and methods for the accurate and automated sorting and metering of recoverable materials may include a bunker with an integral conveyor adapted to meter presorted materials such that predetermined amounts of the materials may be delivered to a baler for baling and sale. Exemplary systems may include an auger screw type conveyor sized and shaped to deliver the materials to, for example, a baling system. The systems may also include a crusher for reducing the volume of the materials prior to metering from the bunker; by reducing the volume of the materials in the bunker, a baler may operate more efficiently, increasing output from the facility.

12 Claims, 10 Drawing Sheets

(56) References Cited

U.S. PATENT DOCUMENTS

| | | | |
|---|---|---|---|
| 2,470,278 A | | 5/1949 | West |
| 2,576,784 A | | 11/1951 | Galen |
| 2,615,387 A | | 10/1952 | Messing |
| 2,823,603 A | | 2/1958 | Collins |
| 2,823,799 A | * | 2/1958 | Gangell ..................... 209/680 |
| 2,902,922 A | | 9/1959 | Williams |
| 2,982,201 A | | 5/1961 | Raymond |
| 3,179,040 A | | 4/1965 | Seltzer |
| 3,398,677 A | * | 8/1968 | Theobald et al. ............. 100/37 |
| 3,547,577 A | * | 12/1970 | Lovercheck ................. 53/511 |
| 3,588,356 A | | 6/1971 | Poux et al. |
| 3,787,830 A | | 1/1974 | Cato |
| 3,799,405 A | * | 3/1974 | Wallace ................. B65G 65/46 |
| | | | 198/625 |
| 3,866,529 A | | 2/1975 | Holman |
| 3,877,365 A | | 4/1975 | Berggren |
| 3,921,545 A | * | 11/1975 | Ruegsegger ............ F23G 5/444 |
| | | | 100/95 |
| 3,938,434 A | | 2/1976 | Cox |
| 3,982,483 A | | 9/1976 | Bird et al. |
| 4,037,528 A | | 7/1977 | White |
| 4,113,185 A | * | 9/1978 | Marsh et al. .................... 241/19 |
| 4,253,390 A | * | 3/1981 | Hunt et al. ...................... 100/45 |
| 4,256,035 A | | 3/1981 | Neufeldt |
| 4,289,067 A | | 9/1981 | Hanak |
| 4,323,007 A | | 4/1982 | Hunt et al. |
| 4,355,905 A | | 10/1982 | St. Louis et al. |
| 4,516,492 A | | 5/1985 | Olfert |
| 4,636,127 A | | 1/1987 | Olano et al. |
| 4,709,628 A | | 12/1987 | Glowacki |
| 4,762,280 A | * | 8/1988 | Prisco et al. ...................... 241/3 |
| 4,770,236 A | | 9/1988 | Kulikowski |
| 4,807,816 A | | 2/1989 | Ataka |
| 4,838,750 A | * | 6/1989 | Finch ..................... B65G 65/42 |
| | | | 100/151 |
| 4,852,817 A | | 8/1989 | Tipton |
| 4,897,194 A | | 1/1990 | Olson |
| 4,951,884 A | | 8/1990 | Koenig |
| 5,108,040 A | | 4/1992 | Koenig |
| 5,114,331 A | | 5/1992 | Umehara et al. |
| 5,180,225 A | | 1/1993 | Piccolo, Sr. et al. |
| 5,308,003 A | | 5/1994 | Koenig |
| 5,328,015 A | * | 7/1994 | Volk, Jr. ................. B65G 65/46 |
| | | | 198/548 |
| 5,333,738 A | * | 8/1994 | Fuchs et al. .................... 209/38 |
| 5,373,923 A | | 12/1994 | Koenig |
| 5,383,397 A | | 1/1995 | Battles |
| 5,601,239 A | | 2/1997 | Smith |
| 5,611,268 A | | 3/1997 | Hamilton |
| 5,662,035 A | | 9/1997 | Lee |
| 5,735,199 A | | 4/1998 | Esau |
| 5,819,643 A | | 10/1998 | Mcilwain |
| RE36,023 E | | 1/1999 | Koenig |
| 6,024,226 A | * | 2/2000 | Olivier ..................... 209/172.5 |
| 6,247,662 B1 | | 6/2001 | Hamilton |
| 6,365,857 B1 | * | 4/2002 | Maehata et al. ........... 209/127.3 |
| 6,505,550 B2 | | 1/2003 | Hamilton |
| 6,945,487 B1 | | 9/2005 | Obitz |
| 7,226,213 B2 | | 6/2007 | Kraft |
| 7,360,639 B2 | | 4/2008 | Sprouse et al. |
| 7,523,996 B1 | | 4/2009 | Darst |
| 7,631,596 B2 | | 12/2009 | Williams |
| 7,740,325 B1 | | 6/2010 | Chen |
| 7,828,482 B2 | | 11/2010 | Beausoleil et al. |
| 7,851,585 B2 | | 12/2010 | Brison et al. |
| 8,033,733 B2 | | 10/2011 | Lang |
| 2001/0039887 A1 | * | 11/2001 | Reddoch ..................... 100/117 |
| 2004/0208732 A1 | * | 10/2004 | Kulbeth ................. B65G 33/10 |
| | | | 414/326 |
| 2005/0069446 A1 | | 3/2005 | Kriehn |
| 2008/0121497 A1 | | 5/2008 | Esterson et al. |
| 2010/0266230 A1 | | 10/2010 | Hong |

OTHER PUBLICATIONS

RUNI Danish Engineering, SK240, sales literature, 1 page, found at www.runi.dk, copyrighted 2009.
RUNI Danish Engineering, Screw Compactor, product information, 2 pages, found at www.compactor-runi.com, Apr. 19, 2011.
PolyMax, Polystyrene Foam Densifier, product information, 1 page, found at www.polyman5000.com, copyrighted 2006.
Intcorecycling.com, GreenMax Recycling Machine, product information, 1 page, found at www.intcorecycling.com, copyrighted 2009-2010.
Foam Equipment + Consulting Co., Heger Recycling Equipment, sales literature, 3 pages, found at www.foamequipment.com/heger.com, copyrighted 2011.
RecycleTech Corp., RecycleTech—The Environment Savers, company information, 1 page, found at www.recycletechno.com, copyrighted 2009.
Intcorecycling.com, GreenMax Recycling Machine, product information, 2 pages, found at www.intcorecycling.com, copyrighted 2009-2010.
Sebright Products, Inc., Bright Technologies—Innovators in Dewatering Equipment Technologies, product information, 2 pages, found at www.brightbeltpress.com, copyrighted 2006.

\* cited by examiner

MATERIAL WASTE SORTING SYSTEM AND METHOD

This application claims the benefit of U.S. Provisional Application No. 61/515,842, filed Aug. 5, 2011, which is hereby incorporated by reference in its entirety.

BACKGROUND AND SUMMARY

The life-cycle of many to-be-recycled materials includes sorting at a Material Recovery Facility (MRF) and subsequent baling prior to shipping to an end recycler. This sorting and baling is done to improve the efficiency of recovery and to more accurately track amounts of materials being sent to the ultimate recyclers.

When a material enters a MRF, it generally is sent along a conveyor where it is sorted. The sorted materials are delivered to individual containment areas to accumulate. When it has been determined that a sufficient amount has been collected, the material is sent to a baler. Balers have materials delivered to them, often on a conveyor belt, and perform some compaction prior to forming and tying the bundled materials into individual bales.

Conventional sorting and baling facilities rely on two types systems for delivering materials to the balers. The first system has a sloped floor at the bottom of a sorting containment area. The sloped floor limits the space in the containment area, and it requires tall, expensive facilities to get the desired capacity. The area will have a door opening onto a conveyor, which leads to the opening of the baler. When it is determined that a sufficient amount of material has been collected, the door is opened (often by an operator who is located near the top of the facility, which may be uncomfortably hot), and the material is allowed to fall to the conveyor for transport to the baler.

In the second type, the containment area has a substantially flat floor. When it has been determined that a sufficient amount of material has been collected, the material is forced out toward the baler, often by a bulldozer or other heavy equipment.

Both of these systems may result in considerable error and fail to deliver consistent amounts of material to the baler. The first system relies on eyeballing that the right amount of material has been released and closing the door accordingly. The second type relies on an operator pushing the right amount of material, often requiring large machinery, out onto a conveyor. Because these systems often provide inconsistent amounts of material to the baler, the operation of the baler can be disrupted when there is not sufficient material to make a complete bale.

These and other unmet needs of the known art may be met by the exemplary systems and methods described herein. Exemplary embodiments include a system for metering waste materials. One exemplary embodiment of a system may include: a bunker adapted to receive and store waste materials, the bunker including an exit aperture; a chute adapted to channel waste materials into the bunker, the chute having an upper input aperture at a sorting area and a lower output aperture adapted to allow for transfer of sorted materials into the bunker; a conveying means positioned in the bunker and adapted to convey and meter a predetermined amount of waste material out of the bunker through the exit aperture; and a conveyor positioned to receive waste material from the conveying means and deliver it to a baler. Another exemplary embodiment of a system may include: a bunker adapted to receive and store waste materials, the bunker comprising an exit aperture; a chute adapted to channel waste materials into the bunker, the chute having an upper input aperture at a sorting area and a lower output aperture adapted to allow for transfer of waste materials into the bunker; means for weighing the amount of waste material in the bunker; a conveying means in association with the means for weighing, the conveying means adapted to convey and meter a predetermined amount of waste material out of the bunker through the exit aperture; and a conveyor positioned to receive waste material from the conveying means; wherein the means for weighing is adapted to facilitate transfer of a predetermined amount of waste material from the bunker to the conveyor. Exemplary embodiments of these systems may also include compaction means to compact (e.g., crush, densify, or otherwise compact) the waste material entering the bunker, thus maximizing the space in the bunker. Other exemplary embodiments may comprise various combinations of some or all of the aforementioned features.

Exemplary embodiments also include a method for metering and baling waste materials. One exemplary embodiment of a method may include: sorting waste materials; depositing the sorted materials in a bunker that comprises an exit aperture and a conveying means adapted to convey and meter a predetermined amount of waste material out of the bunker through the exit aperture; and metering a predetermined amount of waste material out of the exit aperture such as for baling. The method may further comprise transferring the waste material to a conveyor associated with a baling apparatus. Moreover, the method may include embodiments wherein the conveying means is an auger screw. Additionally, exemplary methods may include embodiments comprising the step of compacting the waste material prior to deposition in the bunker, and/or further comprising the step of weighing the waste material in the bunker to facilitate the step of metering a predetermined amount of waste material out of the exit aperture.

Additional advantages of the disclosed method and systems are in the description which follows, and in part are understood from the description, or may be learned by practice of the disclosed method and systems. For example, some embodiments may also be useful in other types of systems or for processing other types of materials. The advantages of the disclosed method and systems are realized and attained by means of the elements and combinations particularly pointed out in the appended claims. It is to be understood that both the foregoing general description and the following detailed description are exemplary and explanatory only and are not restrictive.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Conventional Material Recovery Facilities (MRF) suffer from inefficiencies in the storing and baling of sorted materials. Materials sent to MRF are sorted and held until a sufficient amount of the material has been collected and then the material is dispensed to a baler for bundling and removal to a facility for reuse. Uniform size of the bales allows for more efficient transport and along with that, more efficient use of the baler allows for increased output from the facility. However, as described above, conventional delivery of materials to the baler is subject to substantial errors and time lags. For instance, an insufficient amount of material delivered to the baler can disrupt the operation of the baler. Accordingly, exemplary embodiments include systems and methods for increasing efficiency of the storage, metering, and delivery of materials such as to a baler at a MRF. Exemplary embodiments may include a bunker for collecting sorted materials. In one example, the bunker is equipped with a conveying means, wherein the conveying means is adapted to convey and meter the sorted waste out of the bunker for transport to, for example, the baling system and may comprise an auger screw or other conveying means such as other types of screw conveyors or rotating delivery devices, other pushing devices, walking floors, or other suitable conveyors or metering devices. The conveying means may be turned on or off depending on the amount of sorted material in the respective bunker. An exemplary embodiment of a system may include a controller in communication with a weighing means. The weighing means may determine the amount of material in the bunker, and send the information to the controller, which may turn the conveying means on or off depending on predetermined set amounts.

Often, materials that are sorted at the facility must be compacted for baling. Conventional MRF merely deliver the material to the baler and have the baler compact the material prior to baling. This can create a logjam at the baler leading to decreased output at the facility. Accordingly, disclosed embodiments describe systems that may include a crusher or other compactor for reducing the volume of the sorted materials prior to delivery to the baling system. In one example, the crusher may be located in the bunker, receive sorted materials, and compact the materials prior to collection in the bunker.

When compacting takes place in the bunker, and often in the absence of compacting, waste liquids fall from the sorted materials. These liquids may facilitate deterioration of the bunker and the machinery therein or otherwise be a nuisance. Accordingly, an exemplary embodiment of a system may include drains associated with the bunker (e.g., in a lower section) or as a part of an optional compactor, collecting and removing the liquids prior to collection in the respective bunker.

Figure 1:
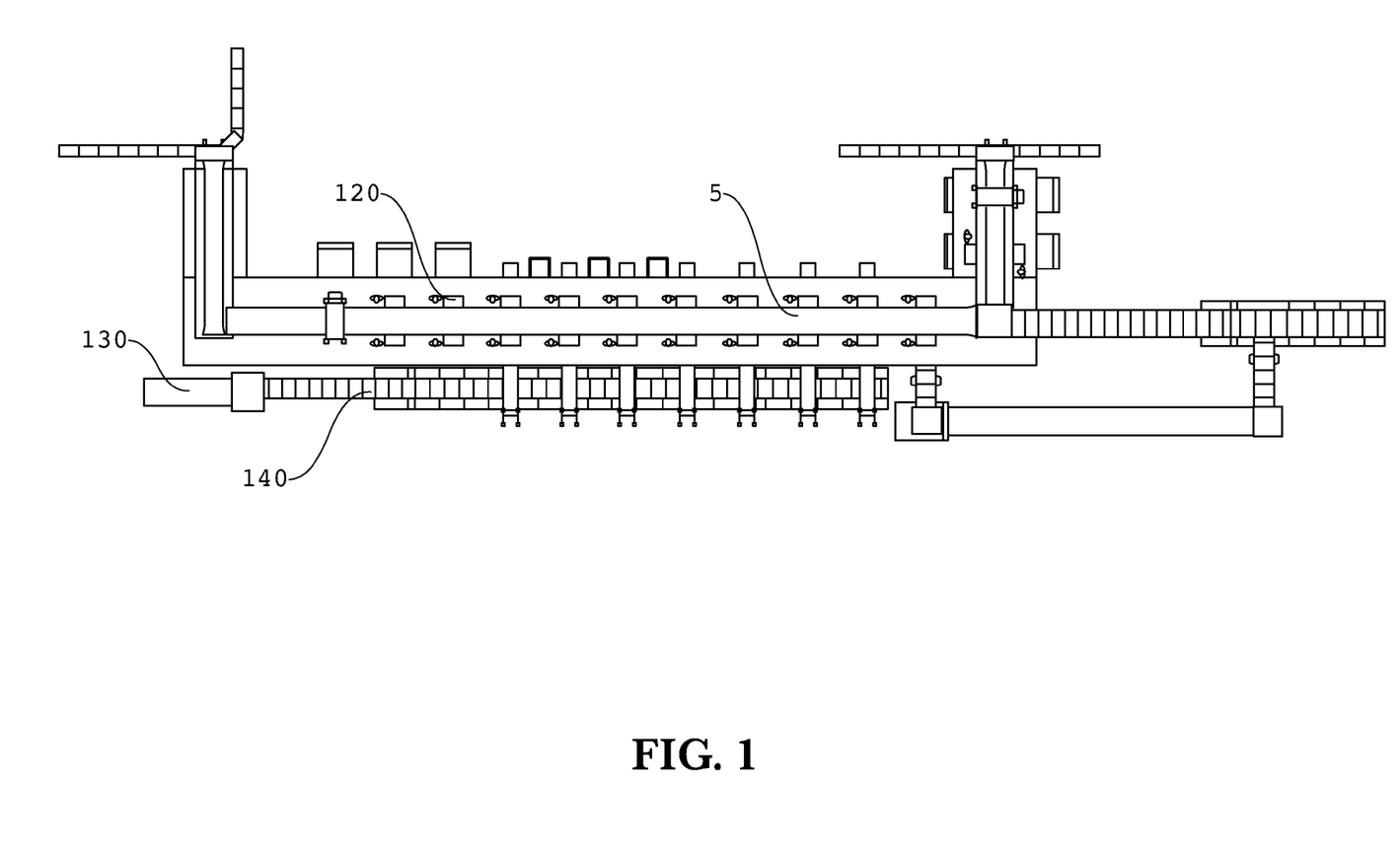
FIG. 1 is a top view of an exemplary MRF.

FIG. 1 shows an exemplary MRF. Here the materials will be dropped onto a sorting conveyor 5 running the length of the sorting area. Many facilities employ human sorters who then remove materials depending on their composition and place the materials into a chute or chutes 120. In an exemplary embodiment, the chute opens into a holding area, termed a bunker (not shown) below the conveyor. The bunker is a holding area where the materials are subsequently metered-from prior to, for example, baling at a baler 130. Each bunker may include an exit aperture that the material is metered through onto a conveyor 140, which will deliver the material to the baler. In this way, different materials can be delivered to a baler along one conveyor.

Figure 2:
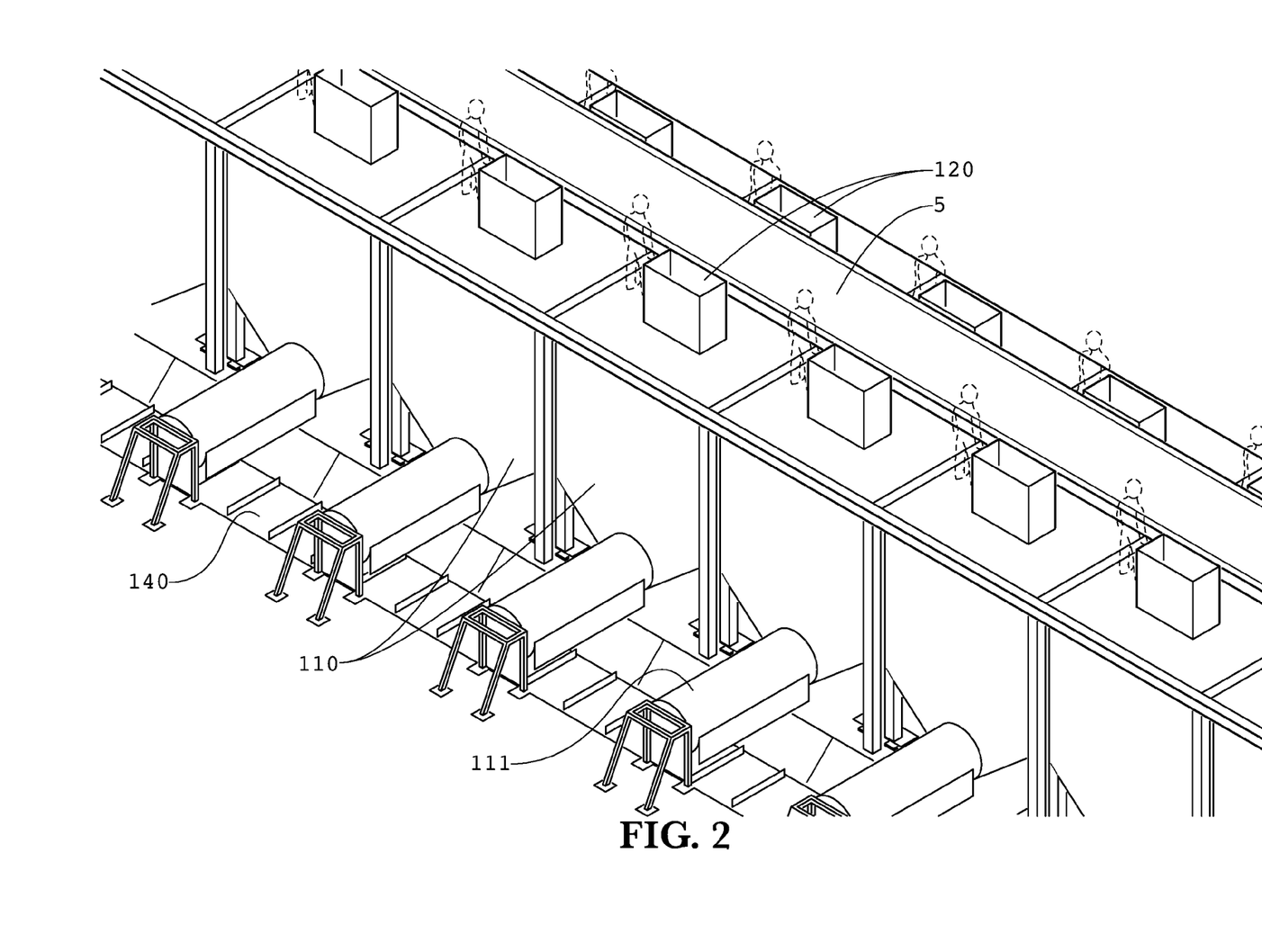
FIG. 2 is a perspective view of an exemplary MRF.

FIG. 2 shows an exemplary MRF. In an exemplary embodiment, the chutes 120 are positioned above the bunkers 110 with two chutes feeding each bunker, one positioned on each side of the sorting conveyor 5. Here, one side of the bunker is shown, with the exit apertures obscured by the optional covers 111. When an appropriate amount of material has been deposited in a respective bunker, the material may be metered from the bunker through the exit aperture to the conveyor 140.

Exemplary embodiments may also be used with other variations of a MRF. For example, some exemplary embodiments may be used with automatic sorting systems. For another example, some exemplary embodiments may be used with other mechanisms for allowing input to the bunker, and some exemplary embodiments may be used with different systems that receive the output from the bunker. Other variations are possible.

Figure 3:
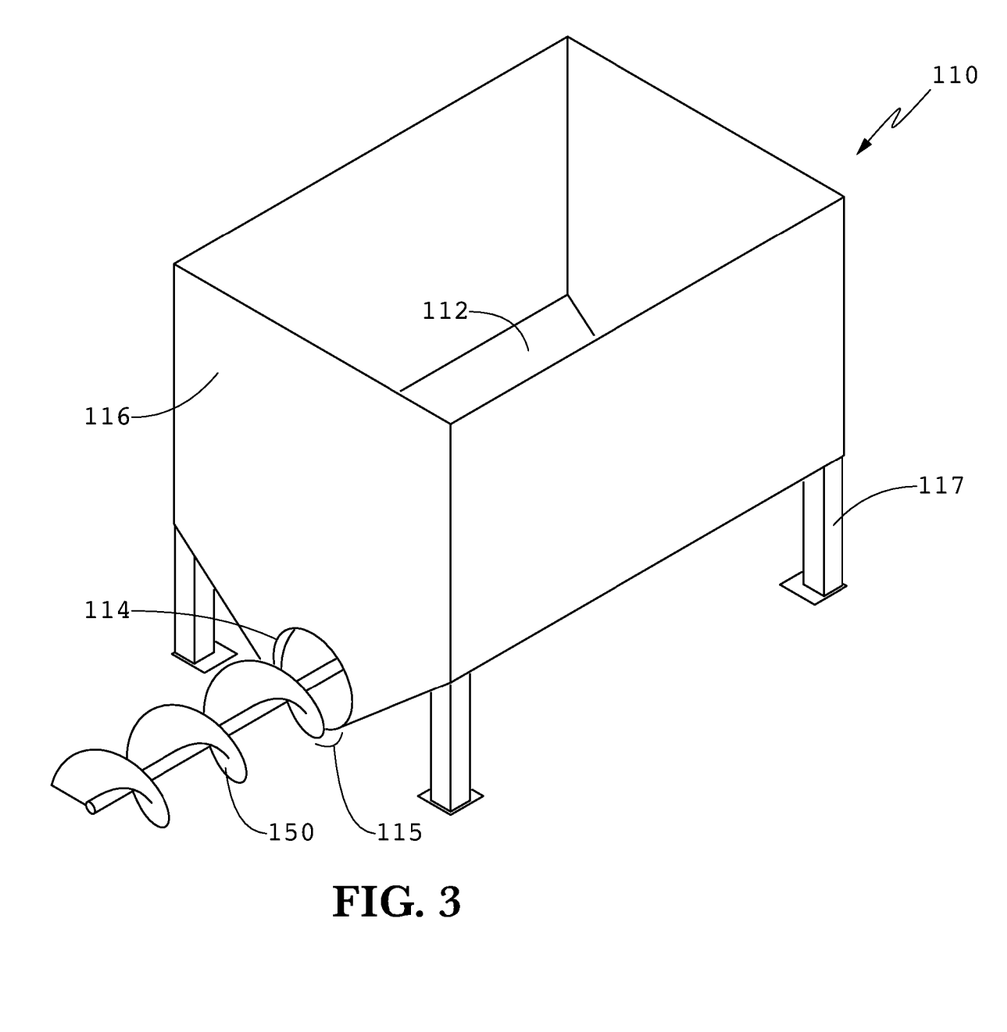
FIG. 3 is a perspective view of an exemplary embodiment of a bunker.

FIG. 3 shows an embodiment of a bunker. In one exemplary embodiment, the bunker may be comprised of an elongate rectangular hopper with a rounded lower edge 115. The bunker has two inwardly sloping walls 112 which serve to feed the material to a conveying means 150 at the base of the hopper. In comparison to a conventional collection area with a sloped wall for forcing out the material when a door is opened, an exemplary embodiment of the bunker may be approximately 40% more efficient. For example, the bunker may hold approximately 70 cubic yards of waste material versus a conventional collection area that may only hold approximately 50 cubic yards because of the significant sloped wall. Those of skill in the art will recognize that the exact shape and size of the bunker may be altered while still retaining the essential core of the inventive concept, thus alternative embodiments contemplate many 3-dimensional shapes, such as, for example, a cylinder, so long as the shape is capable of providing materials to a conveying means for metering to, for example, a baler. The conveying means forces the material out through the exit aperture 114 on a first side 116 of the bunker. An example of the bunker may rest on a set of legs 117. In an embodiment, the legs may be adapted to include a means for weighing (not shown), which is adapted to determine the weight of the material in the bunker for use in determining when to dispense material.

Figure 4:
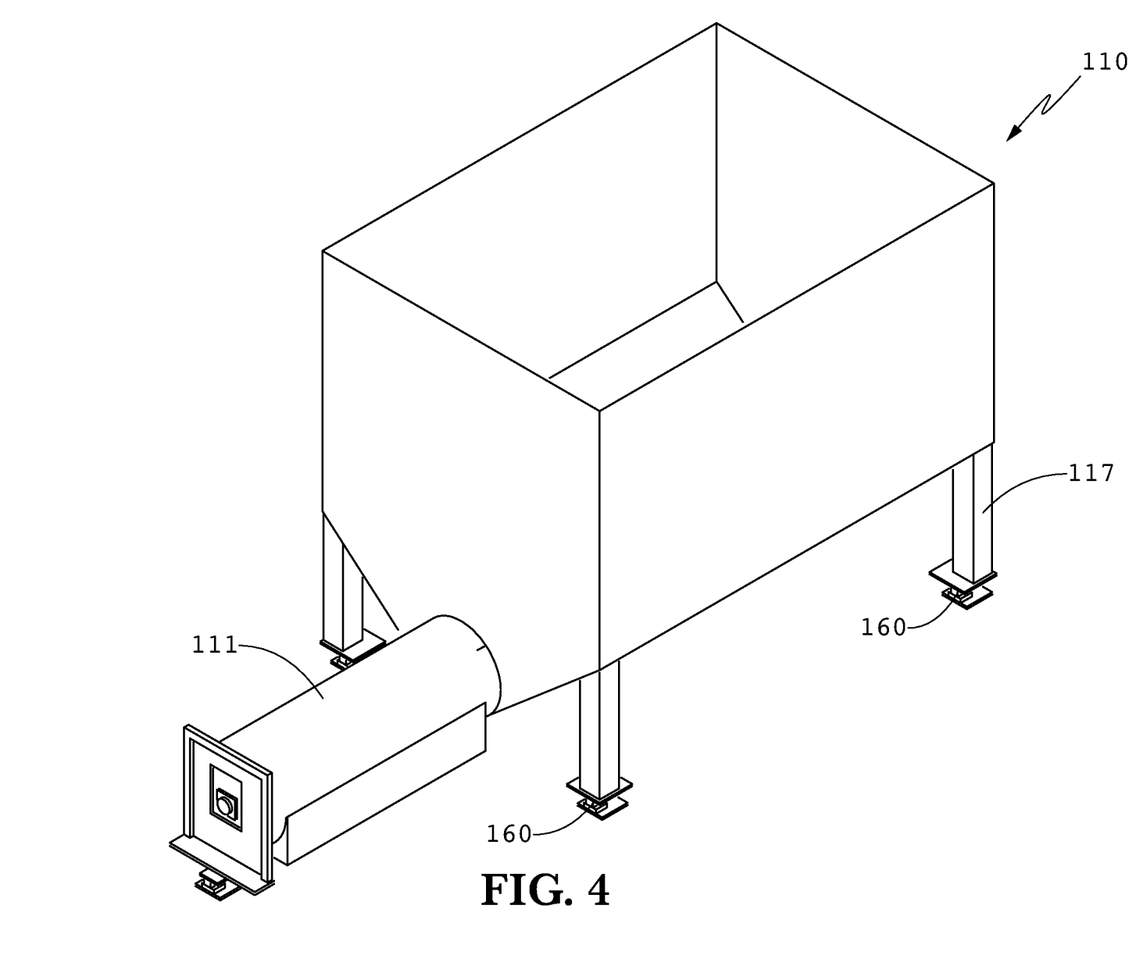
FIG. 4 is a perspective view of an exemplary embodiment of a bunker.

FIG. 4 shows an embodiment of a bunker 110. In this example, the exit aperture of the bunker is obscured by the cover 111, which may overlay the width of the conveyor (not shown) and serve to direct the metered material downward to the conveyor as it is metered from the bunker by the conveying means (not shown). Additionally, the figure shows the legs 117 fitted with means for weighing 160. In an embodiment, the means for weighing comprises at least one load cell adapted to determine the weight of the material in the respective bunker.

Figure 5:
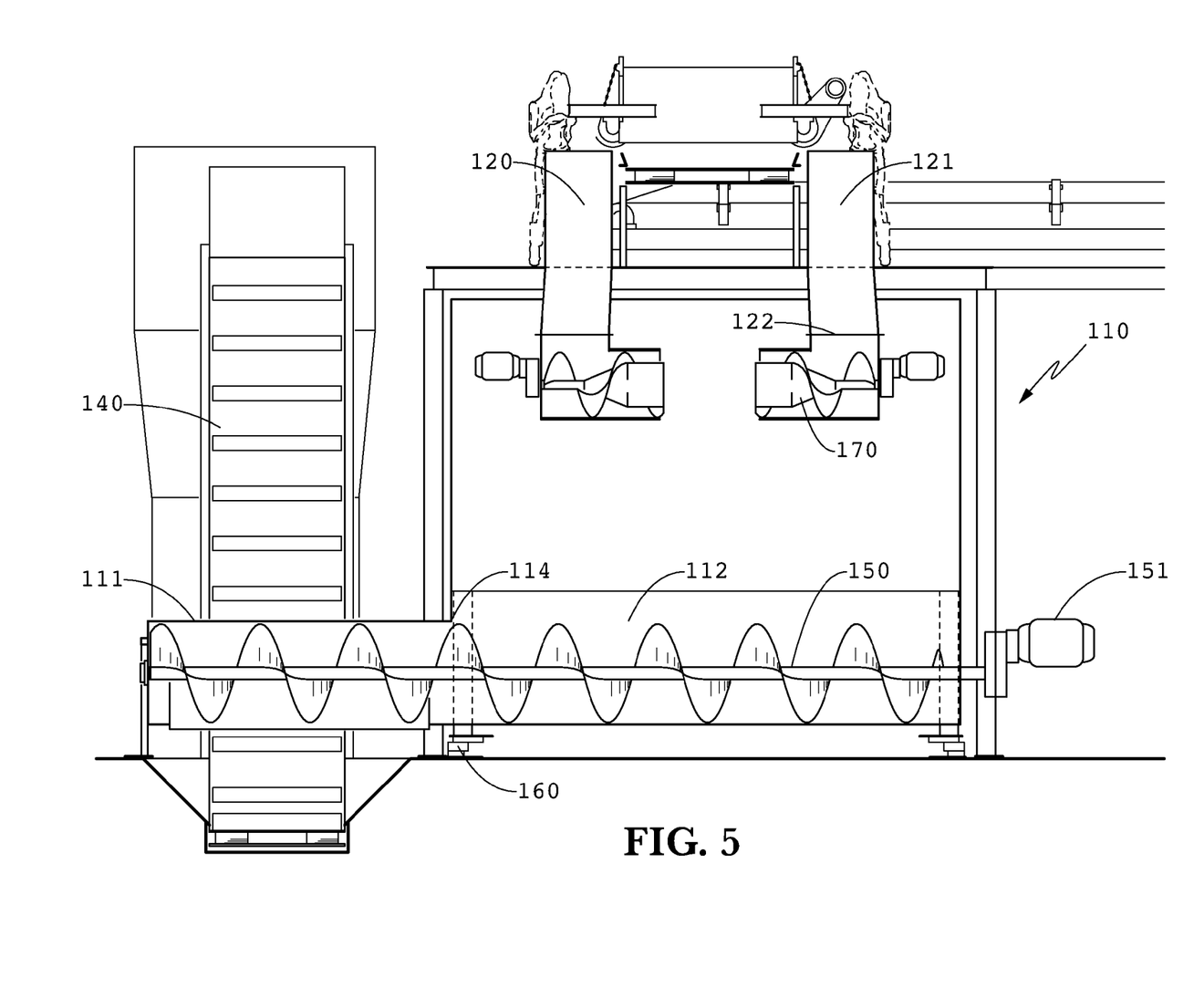
FIG. 5 is cross-section view of an exemplary embodiment of a bunker in a MRF.

FIG. 5 shows a cross-section view of a bunker in a MRF. In an embodiment, sorted material is deposited in a chute 120 through an upper input opening 121 which feeds into a lower output opening 122. In an exemplary embodiment, the output opening may open into a compaction means 170. The compaction means may reduce the volume of the material prior to feeding the material to the bunker 110. The bunker may be shaped and sized to efficiently feed the reduced volume material to a conveying means 150. In an embodiment, the conveying means comprises an auger screw. Other types of conveying devices are possible. In this example, the auger screw is sized and shaped to deliver a predetermined amount of material through the exit aperture 114 to increase the efficiency of the baling process. In an embodiment, the conveying means may be driven by a motor 151 (e.g., a variable frequency drive). The motor may be positioned on the outside of the bunker as shown in the figure, however, those with skill in the art will recognize that the motor may be positioned in any of a number of locations and still function accordingly. The cover 111 can be seen over-laying the portion of the conveying means that extends out from the exit aperture and over the conveyor 140. In this exemplary embodiment, the bunker is shown resting on a weighing means 160 for determining the weight of the material in the respective bunker. In an embodiment, the weighing means may comprise a load cell or other suitable scales or weighing apparatus. Optionally, the bunker may include a drain (not shown) for waste liquids that might accompany the materials into the bunker. In one example, the drain may be located on the lower edge of the bunker.

Figure 6:
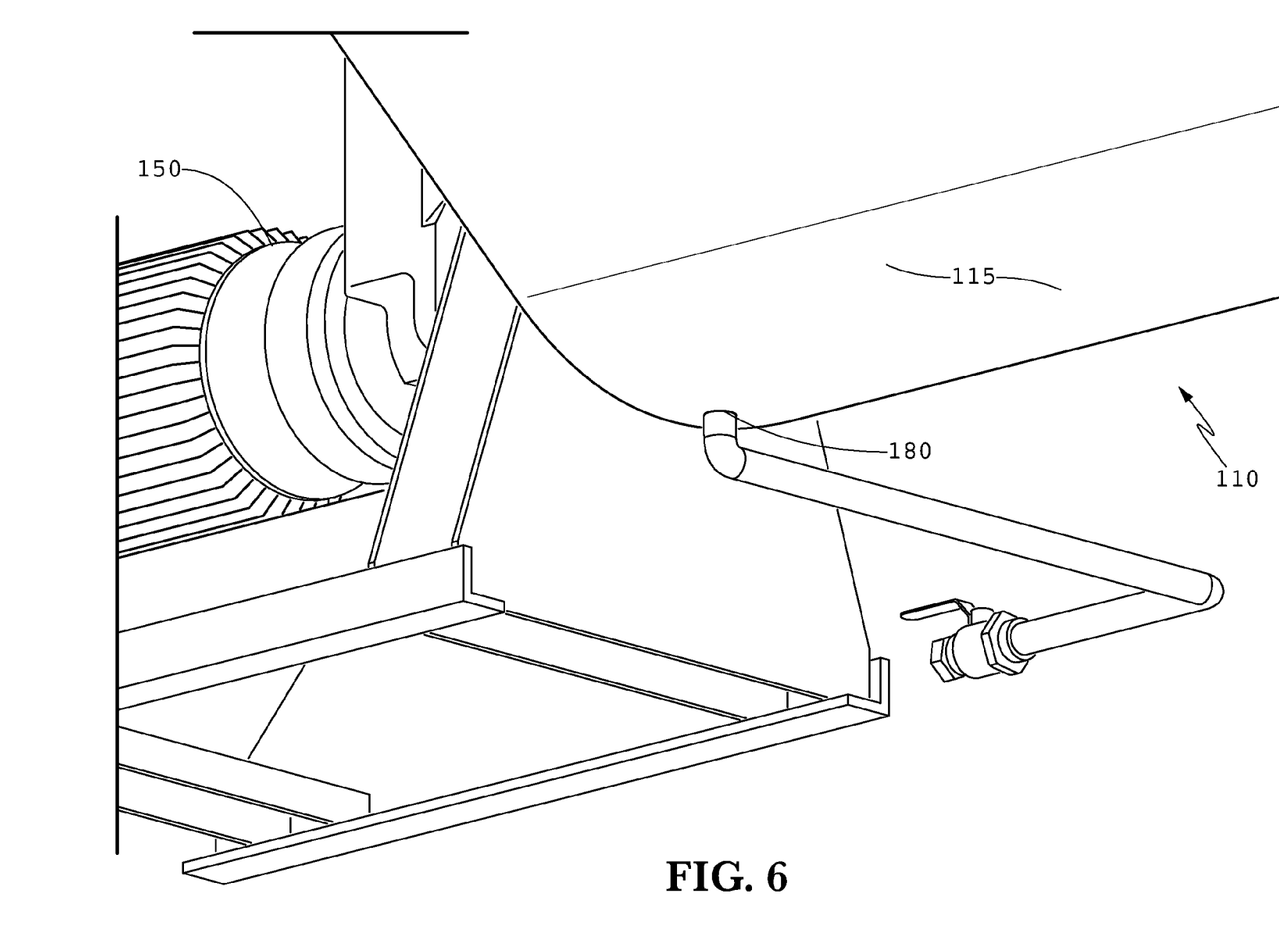
FIG. 6 is a bottom perspective view of an aspect of an exemplary embodiment of a bunker.

FIG. 6 shows a view from the bottom of an exemplary bunker 110. During operation of the MRF, sorted materials are dropped into the bunker; often however, the materials have unwanted liquids in or on them. Without a drain, the liquids would accumulate in the bunker and cause the deterioration of the system or otherwise be a nuisance. Thus, in an exemplary embodiment, the bunker may include a drain 180 along its lower rounded edge 115. Here, the drain includes piping to direct the waste liquid out from the bunker. Alternatively, the drain could be positioned in another location within the bunker, such as near the base of the chute or associated with the optional compactor (e.g., crusher, densifier, etc.) to direct unwanted liquids away from the bunker without allowing them to accumulate at the base of the bunker. Optionally, the piping from the drain may include an automatic or manual shut-off valve for stopping the flow of waste liquids from the bunker.

Figure 7:
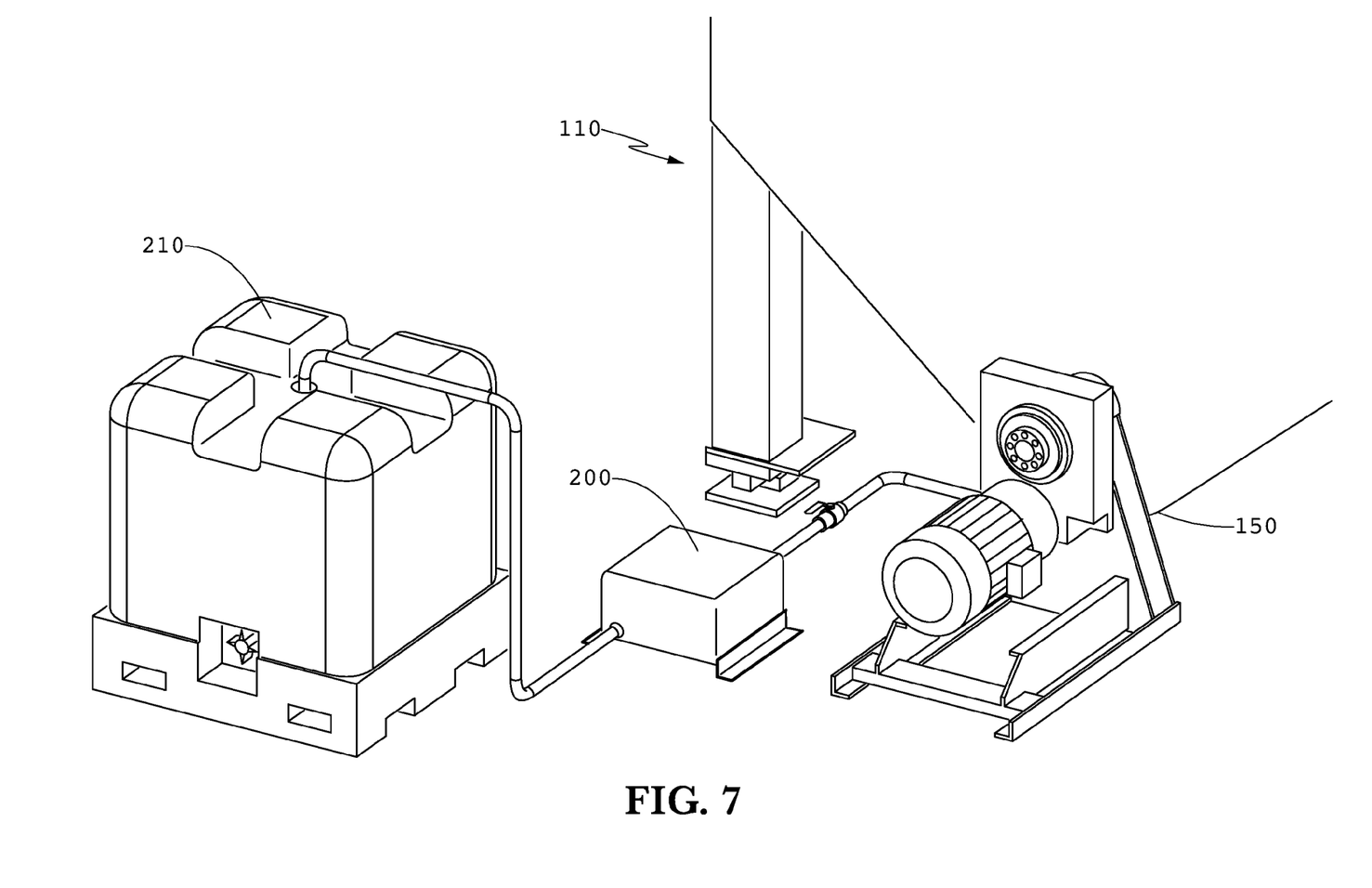
FIG. 7 is a side perspective view of an aspect of an exemplary embodiment of a bunker and associated equipment.

FIG. 7 shows an embodiment of a bunker 110. In this example, the motor for the conveying means is shown on the outside of the bunker. The piping from the drain can be seen leading away from the base of the bunker. Optionally, the piping may lead to a surge tank 200 with an internal pump. The surge tank and pump serve to pump the waste liquids to a storage tank 210 for holding until disposal. In another embodiment, the piping may lead to another drain for disposal.

Figure 8:
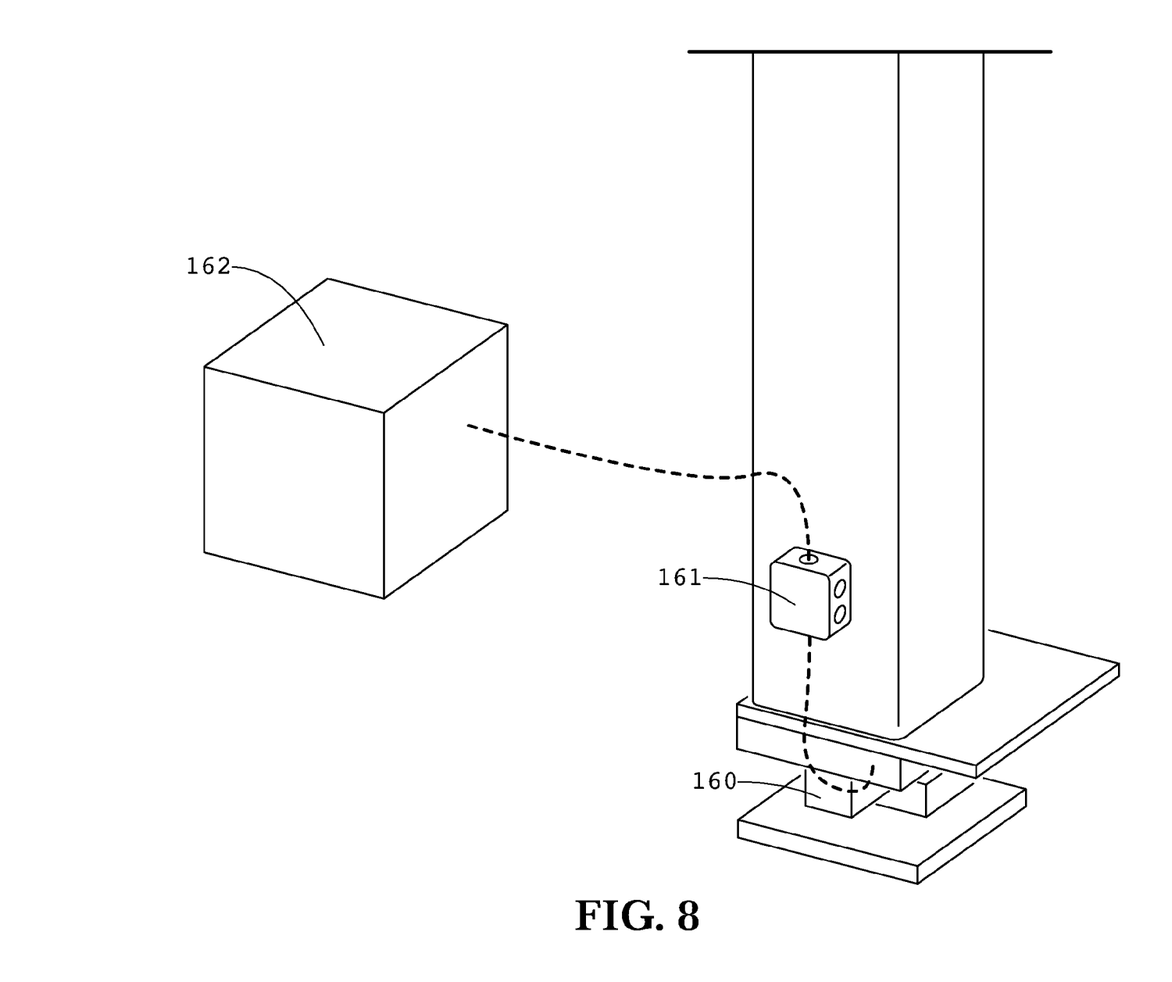
FIG. 8 is a side perspective view of an aspect of an exemplary bunker.

FIG. 8 shows an embodiment of a leg supporting an exemplary bunker. As described above, the conveying means may be automated to meter predetermined amounts of material to a baling system, for example. In an embodiment, the conveying means is controlled by a controller means 162. The controller means may be any suitable controller, processor, computer, or any other suitable device adapted to control the operation of the conveying means. The controller means may be in communication with an optional connection point 161, and the connection point may be in communication with the means for weighing 160. Therefore, in an embodiment, the means for weighing sends a signal to the optional connection point, and the connection point sends a signal to the controller means. The controller means then turns the conveying means on or off according to predetermined criteria. In an exemplary embodiment, the predetermined criteria may include the volume or weight of material desired to be output from the bunker such as, for example, for forming a bale.

In an embodiment, the compaction means 170 may be a crusher such as described in U.S. patent application Ser. No. 13/012,277, filed on Jan. 24, 2011, the content of which is hereby incorporated by reference as if recited fully herein. The crusher serves to reduce the volume of material prior to dropping it into the bunker. Some materials such as, for example, metal cans, plastic bottles and bags, etc. are very low density and thus, the baler can operate much more efficiently if the material has its volume reduced prior to introduction to the baler. In the absence of a crusher reducing the volume of materials prior to the baler, the baler must be used to reduce the volume of the materials, reducing the output of the MRF as a whole. For example, a conventional baler may require approximately 30 strokes to compact the material, whereas a baler in association with an exemplary embodiment of a compaction means may only require approximately 5 strokes (i.e., six times more efficient). Moreover, containers of all sorts may contain waste liquids upon sorting, and the crusher may also serve to squeeze the unwanted liquids from the containers during the crushing process. Accordingly, the crusher may include one or more drain apertures or comprise a grated floor to direct waste liquids form the crusher. The crusher may comprise a main compaction chamber with an inlet opening for receiving sorted materials from the chute. In an embodiment of the crusher, within the main compaction chamber is a screw assembly. One example of a crusher may have screw with a flattened section to facilitate crushing.

Figure 9:
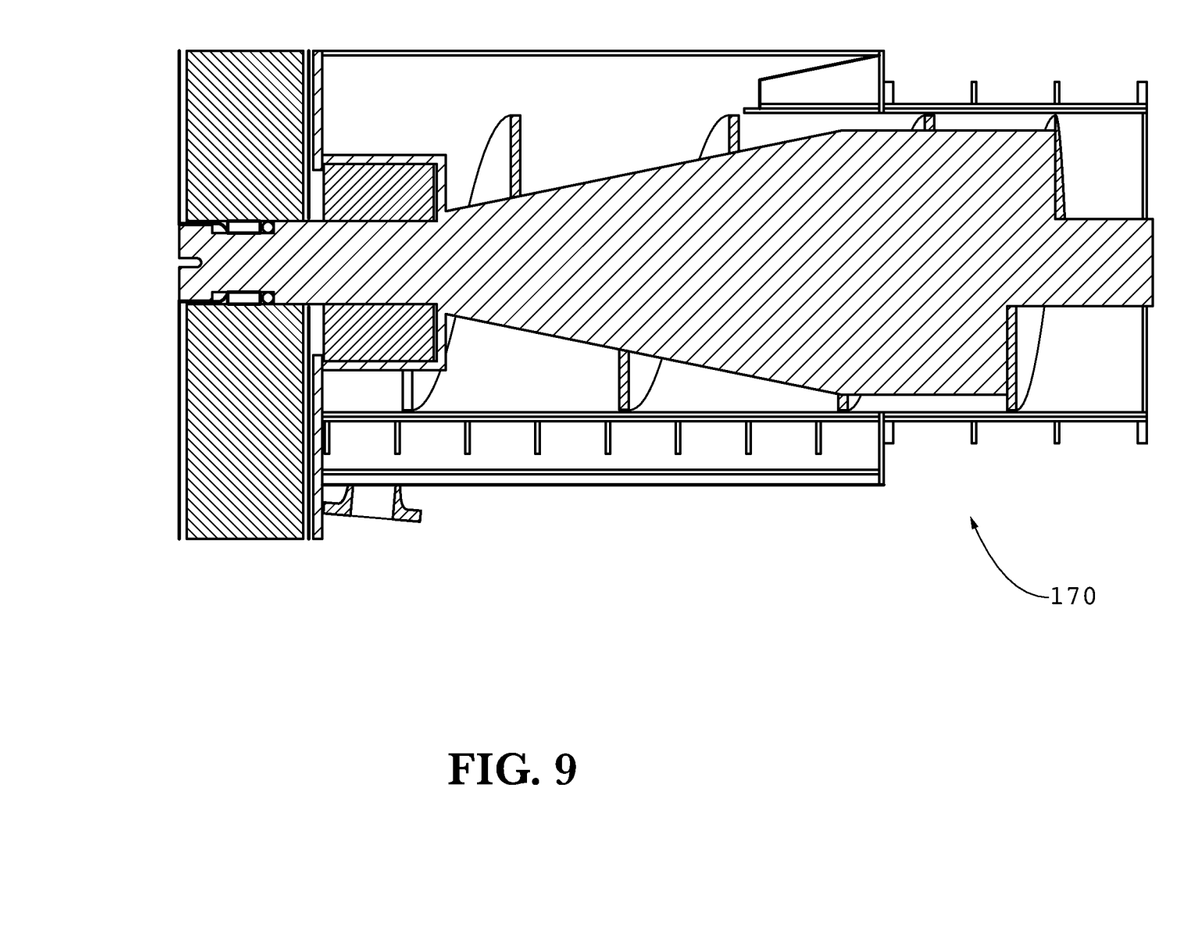
FIG. 9 is a cross-section view of an exemplary embodiment of a crusher.

FIG. 9 shows a cross-section of an embodiment of an exemplary crusher 170. The screw assembly may be mounted to or otherwise extend generally between a proximal and distal end of the compaction chamber. Exemplary embodiments of the crusher include an electric motor to turn the screw assembly. In an exemplary embodiment, the screw assembly comprises a screw with an increasing diameter as it drives the material from one end to the other. The increasing diameter serves to drive the material outward to a wall of the crusher, pinching the material between the screw and the wall. Once the diameter of the screw reaches its largest diameter, it includes a section having a uniform diameter (i.e., a flattened section). In one exemplary embodiment, this section may comprise substantially half of the total length of the screw. The extended section of enlarged diameter keeps the materials in a reduced volume space to further crush the materials.

The walls of the compaction chamber are fabricated from materials that are strong enough to withstand the force exerted by the materials that are compacted or compressed by the screw assembly during operation of the crusher. In an exemplary embodiment, the compaction chamber may be substantially cylindrical in geometry, with at least one opening at the distal end of the compaction chamber that allows the compressed or compacted material to exit. However, in other embodiments, the inlet chamber may be any number of geometries and positions that allow material to enter the compaction chamber.

One or more flow bars may be situated within at least a portion of the interior of the compaction chamber. The one or more flow bars facilitate the flow of material being compacted within the compaction chamber during use of the crusher.

Alternatively, the crusher may be adapted to meter predetermined amounts of reduced volume materials. Accordingly, exemplary embodiments of the screw assembly may include a metering member, such as a metering bar or metering tube along at least a portion of the length thereof. In some embodiments, the metering member may be integral with at least a portion of the screw assembly. However, in other embodiments, the metering member may be removably attached to the screw assembly.

Figure 10:
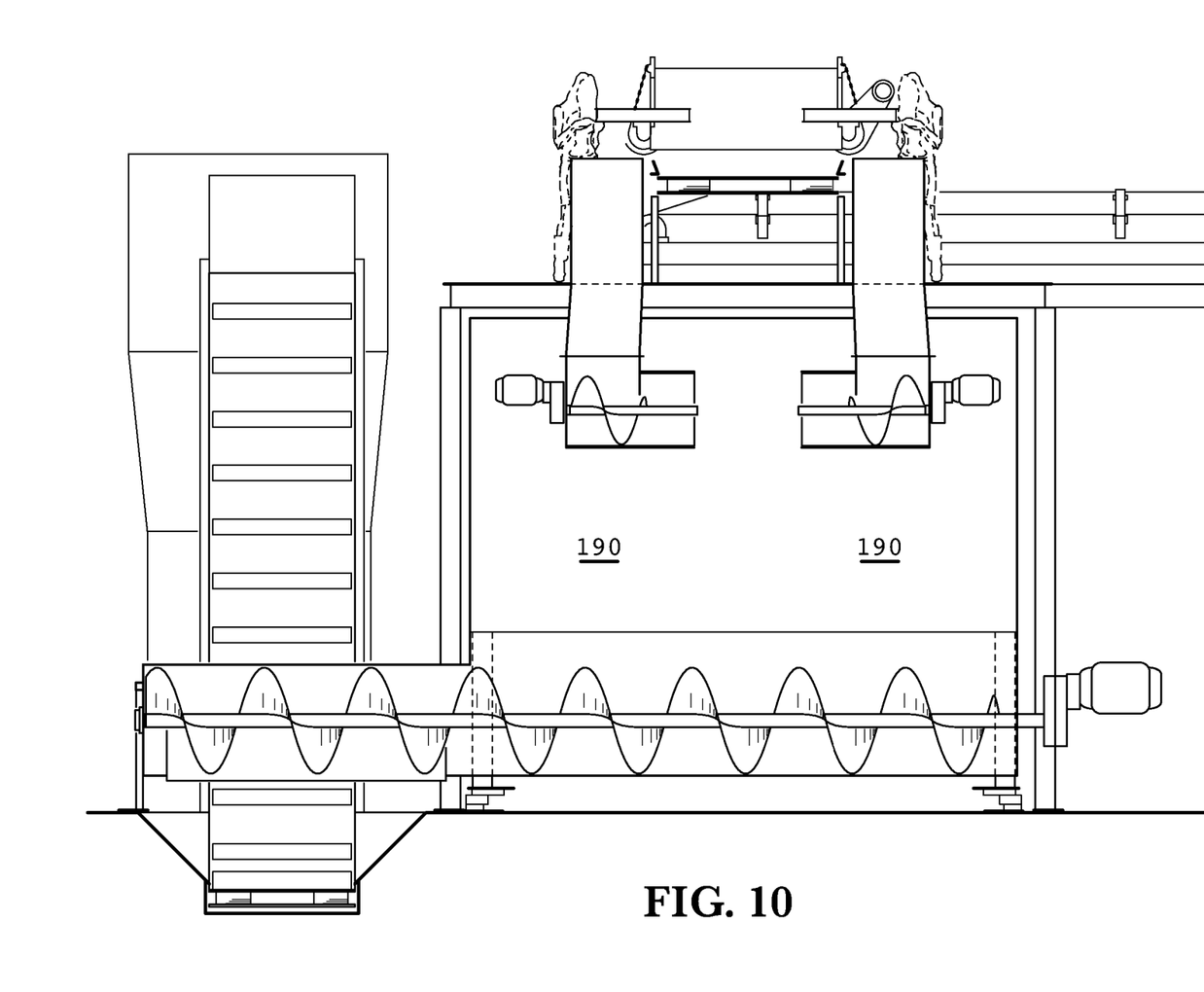
FIG. 10 is a cross-section view of another exemplary embodiment of a bunker comprising a compactor.

FIG. 10 shows another exemplary embodiment of a bunker that includes a different type of compactor. In this example, the compactor 190 comprises a compression screw that is adapted to densify materials such as plastic bags or other flat plastic sheets. Densification of these materials allows for much more efficient use of the bunker and, for example, a subsequent baling system.

The terms "a" and "an" and "the" and similar references used in the context of describing the disclosed embodiments (especially in the context of the following claims) are to be construed to cover both the singular and the plural, unless otherwise indicated herein or clearly contradicted by context.

Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the disclosed embodiments and does not pose a limitation on the scope of the disclosed embodiments unless otherwise claimed. No language in the specification should be construed as indicating any non-claimed element to be essential to the practice of the disclosed embodiments or any variants thereof.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

Exemplary embodiments of this invention are described herein, including the best mode known to the inventors for carrying out the invention(s). Of course, variations on the disclosed embodiments will become apparent to those of ordinary skill in the art upon reading the foregoing description. The inventors expect skilled artisans to employ such variations as appropriate, and the inventors intend for the invention(s) to be practiced otherwise than as specifically described herein. Accordingly, this disclosure includes all modifications and equivalents of the subject matter recited in the claims appended hereto as permitted by applicable law. Moreover, any combination of the above described elements in all possible variations thereof is encompassed by the disclosed embodiments unless otherwise indicated herein or otherwise clearly contradicted by context.

Having shown and described exemplary embodiments of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is claimed is:

1. A system for metering sorted waste materials comprising:
   a bunker adapted to receive and store waste materials, the bunker comprising an exit aperture;
   a chute adapted to channel waste materials into the bunker, the chute having an upper input aperture at a sorting area and a lower output aperture adapted to allow for transfer of waste materials into the bunker;
   a conveying means positioned in the bunker and adapted to convey and meter a predetermined amount of waste material out of the bunker through the exit aperture, the conveying means configured to be turned on when the predetermined amount of waste material has been deposited in the bunker to convey and meter the predetermined amount of waste material out of the bunker, and the conveying means configured to be turned off when the predetermined amount of waste material has been conveyed and metered out of the bunker; and
   a conveyor positioned to receive waste material from the conveying means.

2. The system of claim 1 further comprising a means for weighing the amount of waste material in the bunker.

3. The system of claim 2 wherein the means for weighing comprises at least one load cell.

4. The system of claim 2 further comprising a controller means for controlling the operation of the conveying means such that the means for weighing the amount of waste material in the bunker is adapted to send a signal to the controller means to activate the conveying means.

5. The system of claim 1 wherein the conveying means comprises an auger screw.

6. The system of claim 1 further comprising:
   a drain in the bunker adapted to drain liquid from the bunker; and
   a tank in fluid communication with the drain and adapted to collect liquid drained from the bunker.

7. The system of claim 1 wherein the bunker is comprised of an elongate rectangular hopper with a lower edge defining a rounded shape.

8. The system of claim 1 further comprising a compaction means in association with the lower output aperture of the chute for reducing a volume of waste materials prior to deposition in the bunker, the compaction means adapted to receive waste materials from the chute and deliver the reduced volume waste material to the bunker.

9. The system of claim 8 wherein the compaction means is adapted to crush bottles.

10. The system of claim 8 wherein the compaction means is adapted to densify flat plastic sheets.

11. The system of claim 1 wherein the bunker is configured to hold more than 50 cubic yards of the waste material.

12. The system of claim 1 where the bunker is configured to hold approximately 70 cubic yards of the waste material.

* * * * *